United States Patent
Lee et al.

(10) Patent No.: US 8,374,405 B2
(45) Date of Patent: Feb. 12, 2013

(54) CAMERA DEVICE AND IDENTITY RECOGNITION METHOD UTILIZING THE SAME

(75) Inventors: Hou-Hsien Lee, Taipei Hsien (TW); Chang-Jung Lee, Taipei Hsien (TW); Chih-Ping Lo, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 705 days.

(21) Appl. No.: 12/606,125

(22) Filed: Oct. 26, 2009

(65) Prior Publication Data

US 2011/0052004 A1    Mar. 3, 2011

(30) Foreign Application Priority Data

Aug. 28, 2009    (CN) ............. 2009 1 0306310

(51) Int. Cl.
*G06K 9/00* (2006.01)
*G06K 9/68* (2006.01)

(52) U.S. Cl. .............. 382/118; 382/154; 382/218

(58) Field of Classification Search .......... 382/118, 382/209, 218, 154
See application file for complete search history.

(56) References Cited

U.S. PATENT DOCUMENTS

| 7,570,785 B2 * | 8/2009 | Breed | 382/100 |
| 7,894,636 B2 * | 2/2011 | Kozakaya | 382/118 |
| 2004/0263625 A1 * | 12/2004 | Ishigami et al. | 348/152 |
| 2010/0303294 A1 * | 12/2010 | Zschau | 382/103 |

\* cited by examiner

*Primary Examiner* — Daniel Mariam
(74) *Attorney, Agent, or Firm* — Altis Law Group, Inc.

(57) ABSTRACT

A camera device includes an image capturing module, a face detection module, a light detection and ranging (LIDAR) system, a storage module, and a microprocessor. The image capturing module continuously captures images of a determined filed. The face detection module detects the images to obtain a face to be tested, and records coordinates of the face in the image. The LIDAR system scans the face to be tested in the determined field according to the coordinates thereby to obtain three-dimensional information of the face to be tested. The storage module stores three-dimensional information of a determined face. The microprocessor compares the three-dimensional information of the face to be tested with the three-dimensional information of the determined face, and then outputs a recognition signal.

9 Claims, 3 Drawing Sheets

CAMERA DEVICE AND IDENTITY RECOGNITION METHOD UTILIZING THE SAME

BACKGROUND

1. Technical Field

The present disclosure relates to a camera device and an identity recognition method utilizing the camera device.

2. Description of Related Art

A light detection and ranging (LIDAR) system is an optical sensing system usually used to collect topographic data. For example, the system is widely used by the national oceanic and atmospheric administration (NOAA) and national aeronautics and space administration (NASA) scientists to document topographic changes along shorelines. In general, a LIDAR system is capable of emitting laser light at a rate of 7,000 to 8,000 pulses per second, to have a scanning measurement with a high precision. The LIDAR system depends on the known light speed, proximately 0.3 meters per nanosecond. Using this constant, a returning light photon has traveled to and from an object can be calculated.

A common camera device is frequently utilized to conduct facial recognition for security purposes. However, the common camera device takes the face recognition via analyzing a two-dimensional image of a person's face, therefore, the accuracy of a recognition result relies upon the capturing environment. The common camera device also cannot tell whether the two-dimensional image for recognition is captured from an actual person or a picture of the person, thus raising a question of reliability for such recognition. The present disclosure tries to combine the LIDAR system with a camera device to solve the shortfalls of the current art.

DETAILED DESCRIPTION

Figure 1:
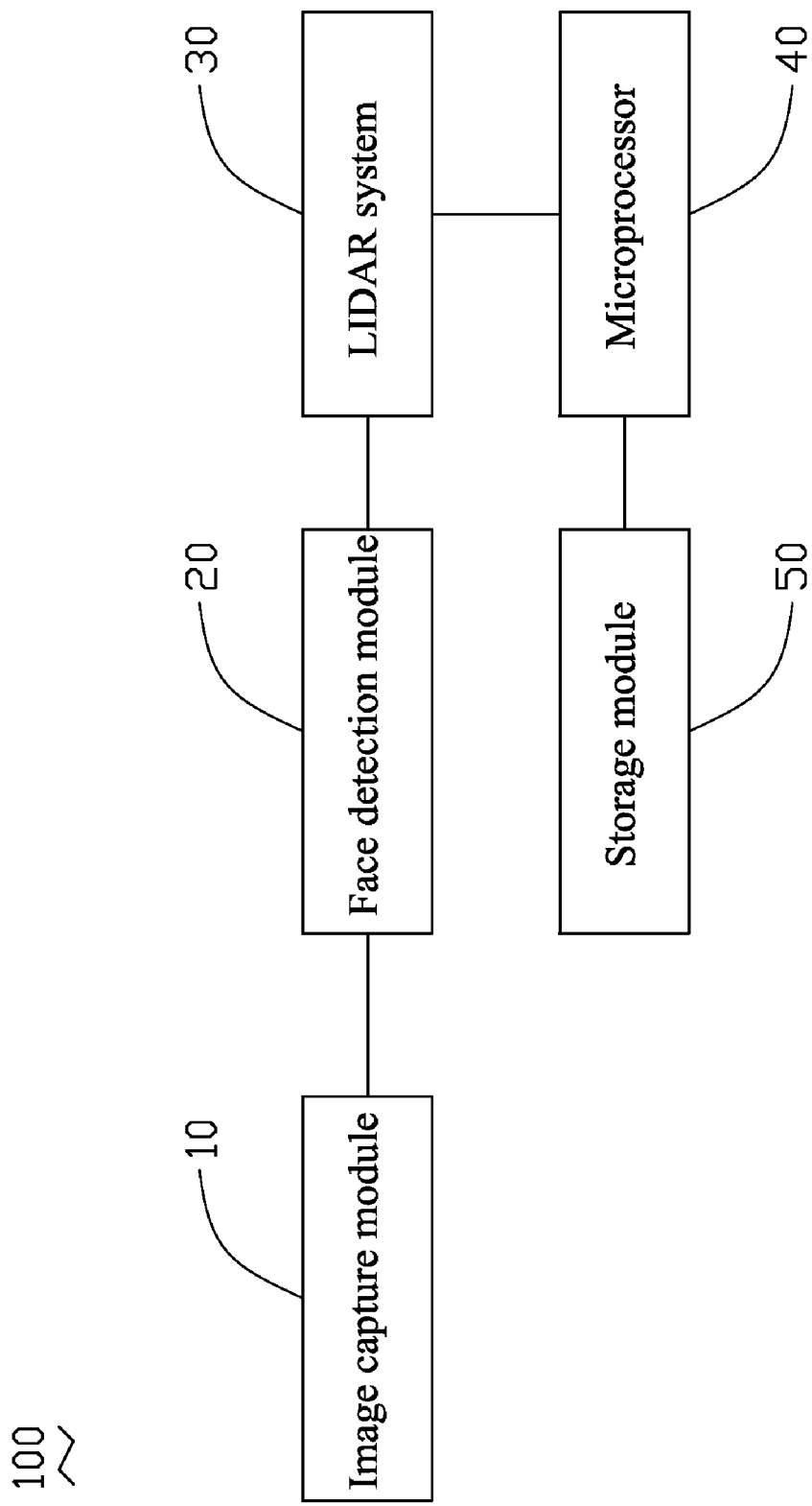
FIG. 1 is a block diagram of an exemplary embodiment of a camera device.

Referring to FIG. 1, an exemplary embodiment of a camera device 100 includes an image capture module 10, a face detection module 20, a light detection and ranging (LIDAR) system 30, a microprocessor 40, and a storage module 50.

The image capture module 10 includes a charge coupled device (CCD) (not shown) and a lens (not shown).

The face detecting module 20 may be a well-known face recognition system, which calculates characteristic values of images captured by the image capture module 10 to obtain faces in the images. The characteristic values may be pixel values.

The LIDAR system 30 is capable of continuously emitting laser light. For the light has reflection characteristic, a distance of an object away from the LIDAR system 30 can be obtained according to a speed of the light multiplied by half a time delay between a transmission pulse and a reflected pulse of the light. Therefore, three-dimensional information of the object can be obtained. In one exemplary embodiment, the three-dimensional information of the object includes three-dimensional coordinates of all points of the object.

In use, the image capture module 10 captures an image of a person in a determined field. The face detection module 20 detects the image to obtain a face of the person in the image, and records coordinates of the face in the image. The coordinates of the face in the image include coordinates of all points of the face in the image, which are usually indicated with a rectangle frame represented in the image capture module 10. Therefore, a position of the face in the image also can be determined by two coordinates of a top left corner and a bottom right corner of the rectangle frame of the face in the image.

The LIDAR system 30 transmits laser light according to the coordinates of the face in the image to scan the face of the person in the determined field, thereby to obtain three-dimensional information of the face of the person. The three-dimensional information of the face of the person is then transmitted to the microprocessor 40. The microprocessor 40 stores the three-dimensional information of the face of the person in the storage module 50. The three-dimensional information of the face of the person is stored as standard information.

The image capture module 10 then continues to capture images of the determined field. The face detection module 20 continues to detect the images captured by the image capture module 10. When the face detection module 20 detects a face to be tested appearing in an image, the face detection module 20 records coordinates of the face to be tested in the image, and transmits the coordinates of the face to be tested to the LIDAR system 30.

The LIDAR system 30 transmits laser light according the coordinates of the face to be tested in the image to scan the face to be tested in the determined field, thereby to obtain three-dimensional information of the face to be tested. The three-dimensional information of the face to be tested is then transmitted to the microprocessor 40.

The microprocessor 20 compares the three-dimensional of the face to be tested with the three-dimensional information of the determined face stored in the storage module 50. When the three-dimensional information of the face to be tested and the three-dimensional information of the determined face is not equal to each other, or a difference between the three-dimensional information of the face to be tested and the three-dimension information of the determined face exceeds a pre-determined value, the microprocessor 40 outputs a first recognition signal indicating that the face to be tested is not the determined face, and a site security system refuses permission of entrance. When the three-dimensional information to be tested and the three-dimensional information of the determined face is equal to each other, or the difference between the three-dimensional information to be tested and the three-dimensional information of the determined face does not exceed the pre-determined value, the microprocessor 40 outputs a second recognition signal indicating that the face to tested is recognized, and the site security system allows entry of the person who has the face to be tested accordingly.

Figure 2A:
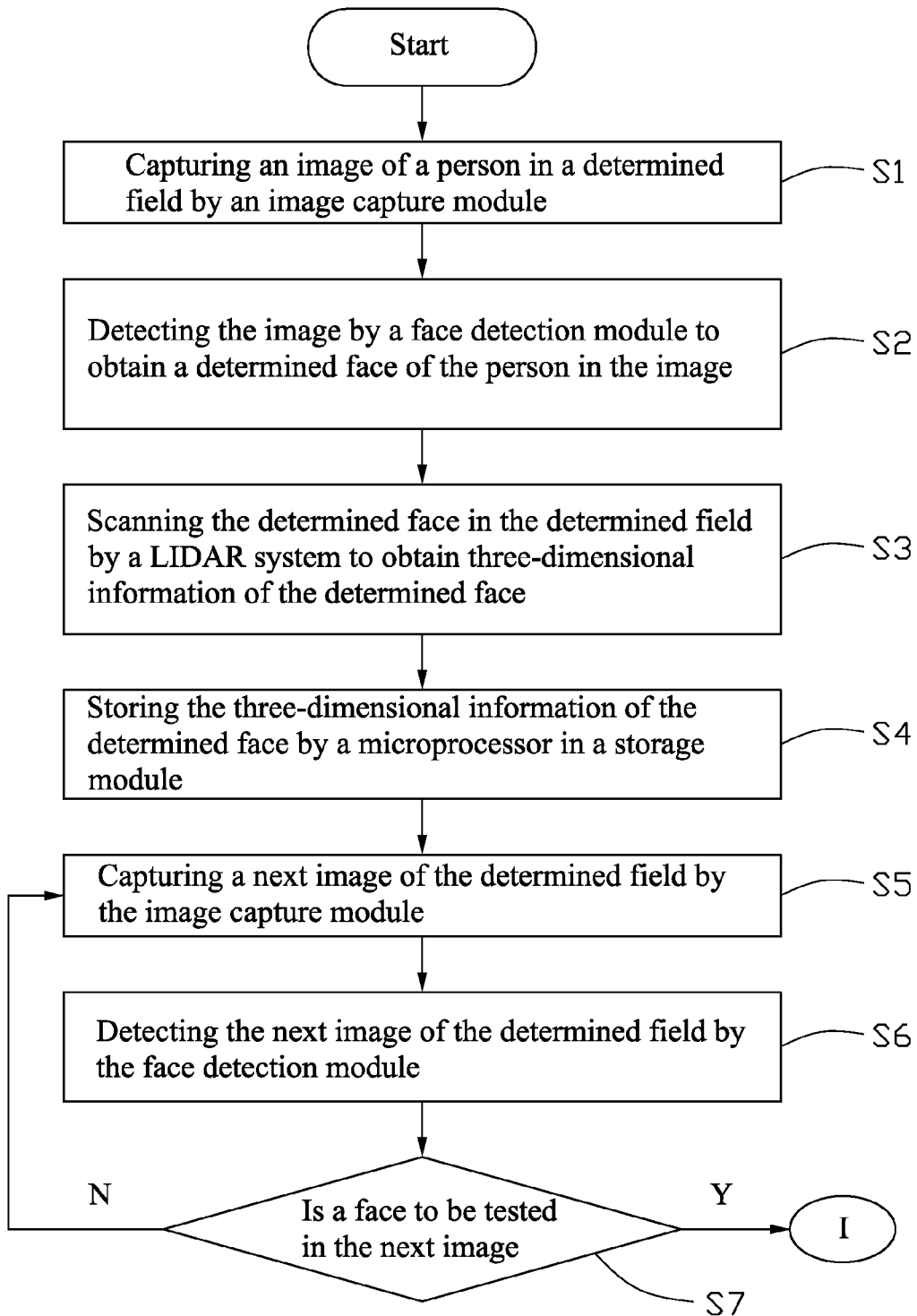
FIG. 2A and FIG. 2B is a flowchart of an exemplary embodiment of an identity recognition method utilizing the camera device of FIG. 1.
Figure 2B:
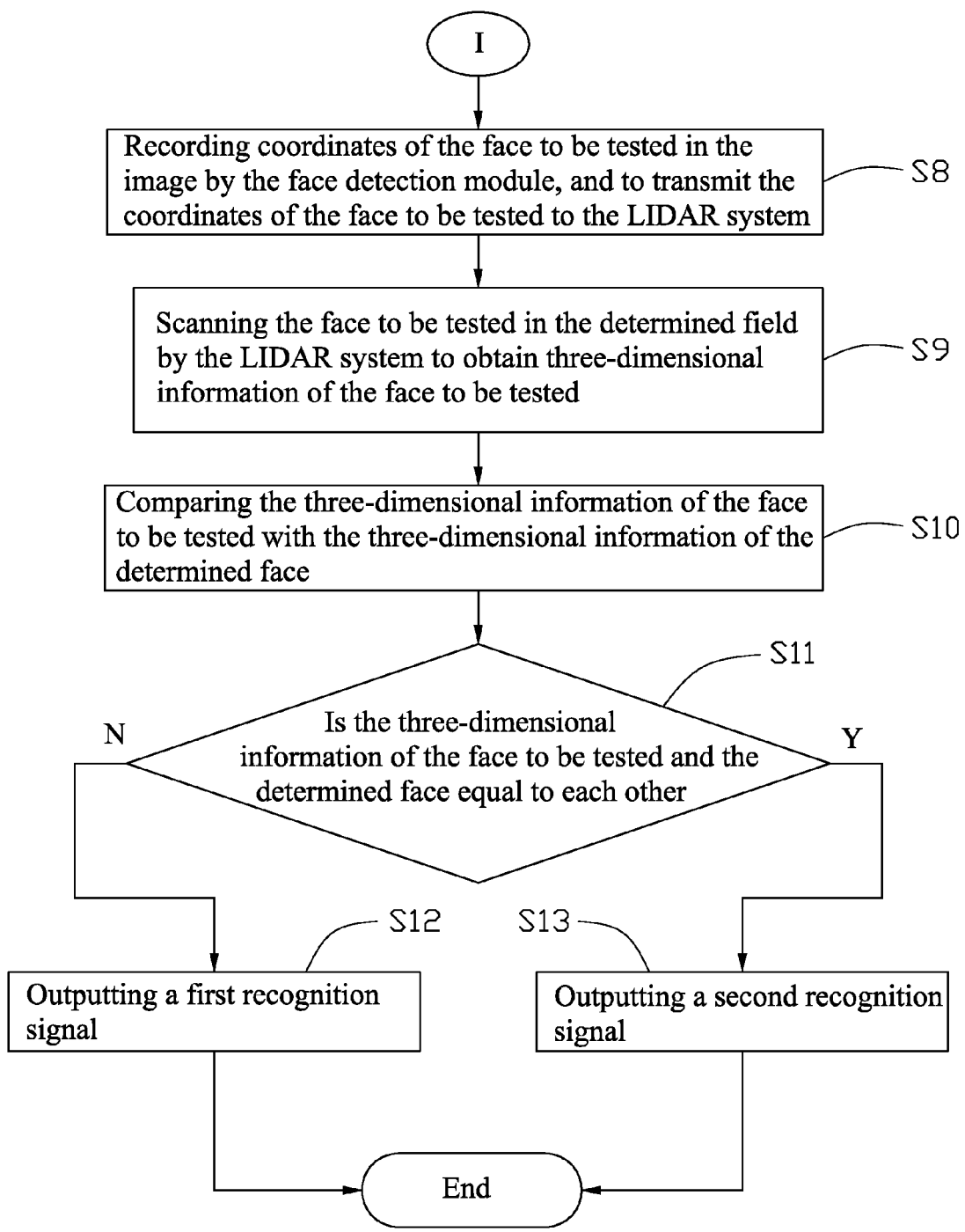

Referring to FIG. 2A and FIG. 2B, an identity recognition method utilizing the camera device 100 is provided, which includes the following steps.

In step S1, the image capture module 10 captures an image of a person in a determined field.

In step S2, the face detection module 20 detects the image captured by the image capture module 10, to obtain a determined face of the person in the image, and records and transmits coordinates of the determined face in the image to the LIDAR system 30.

In step S3, the LIDAR system 30 transmits laser light according to the coordinates of the determined face in the image to scan the determined face in the determined field, to obtain three-dimensional information of the determined face, and transmits the three-dimensional information of the determined face to the microprocessor 40.

In step S4, the microprocessor 40 stores the three-dimensional information of the determined face in the storage module 50 as standard information.

In step S5, the image capture module 10 continues to capture images of the determined field.

In step S6, the face detection module 20 continues to detect the images captured by the image capture module 10 to obtained a face to be tested;

In step S7, a determination is made whether the face to be tested is obtained in the images captured by the image capture module 10; if the face to be tested is not obtained in the images, the flow returns to step S5; if the face to be tested is obtained in one of the images, the flow goes to step S8.

In step S8, the face detection module 20 records coordinates of the face to be tested in the image, and transmits the coordinates of the face to be tested to the LIDAR system 30.

In step S9, the LIDAR system 30 transmits laser light according to the coordinates of the face to be tested in the image, to scan the face to be tested in the determined field, thereby to obtain three-dimensional information of the face to be tested, and then transmit the three-dimensional information of the face to be tested to the microprocessor 40.

In step S10, the microprocessor 40 compares the three-dimensional information of the face to be tested with the three-dimensional information of the determined face stored in the storage module 50.

In step S11, a determination is made as to whether the three-dimensional information of the face to be tested and the three-dimensional information of the determined face is equal to each other or not, or a difference between the three-dimensional information of the face to be tested and the three-dimensional information of the determined face exceeds a pre-determined value or not; if the three-dimensional information of the face to be tested and the three-dimensional information of the determined face is not equal to each other, or the difference between the three-dimensional information of the face to be tested and the three-dimensional information of the determined face exceeds the pre-determined value, the flow goes to step S12; if the three-dimensional information to be tested and the three-dimensional information of the determined face is equal to each other, or the difference between the three-dimensional information of the face to be tested and the three-dimensional information of the determined face does not exceed the pre-determined value, the flow goes to step S13.

In step S12, the microprocessor 40 outputs a first recognition signal indicating that the face to be tested is not the determined face.

In step S13, the microprocessor 40 outputs a second recognition signal indicating that the face to be tested is the determined face.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A camera device, comprising:
   an image capture module to capture images of a determined field;
   a face detection module to detect the images captured by the image capture module, to obtain a face to be tested in one of the images, and record coordinates of the face to be tested in the image containing the face;
   a light detection and ranging (LIDAR) to transmit laser light according the coordinates of the face to be tested in the image, to scan the face to be tested in the determined field, thereby to obtain three-dimensional information of the face to be tested;
   a storage module for storing three-dimensional information of a determined face of a person; and
   a microprocessor to compare the three-dimensional information of the face to be tested with the three-dimensional information of the determined face, thereby to output a recognition signal according to a result of the comparison;
   wherein the three-dimensional information of the face to be tested and the determined face is obtained according to a speed of the laser light multiplied by half a time delay between a transmission pulse and a reflected pulse of the laser light.

2. The camera device of claim 1, wherein the three-dimensional information of the face comprises three-dimensional coordinates of all points of the face in the determined field.

3. The camera device of claim 1, wherein the microprocessor outputs the recognition signal for indicating that the face to be tested is not the determined face upon the condition that the three-dimensional of the face to be tested and the three-dimensional information of the determined face is not equal to each other or a difference between the three-dimensional of the face to be tested and the three-dimensional information of the determined face exceeds a pre-determined value.

4. The camera device of claim 1, wherein the microprocessor outputs the recognition signal for indicating that the face to be tested is the determined face upon the condition that the three-dimensional of the face to be tested and the three-dimensional information of the determined is equal to each other or a difference between the three-dimensional of the face to be tested and the three-dimensional information of the determined face does not exceed a pre-determined value.

5. An identity recognition method for a camera device comprising an image capture module, the method comprising:
   capturing images of a determined field via the image capture module;
   detecting the images via a face detection module to obtain a face to be tested in one of the images;
   recording coordinates of the face to be tested in the image via the face detection module, and transmitting the coordinates of the face to be tested to a light detection and ranging (LIDAR) system;
   scanning the face to be tested in the determined field by the LIDAR system according to the coordinates of the face to be tested in the image, to obtain three-dimensional information of the face to be tested, and to transmit the three-dimensional information of the face to be tested to a microprocessor; and
   comparing the three-dimensional information of the face to be tested by the microprocessor with three-dimensional information of a determined face stored in a storage module, to output a recognition signal according to a result of the comparison, wherein the three-dimensional information of the face to be tested and the determined face is obtained according to a speed of the laser light multiplied by half a time delay between a transmission pulse and a reflected pulse of the laser light.

6. The method of claim 5, wherein the recognition signal is output by the microprocessor upon the condition that the microprocessor determines that the three-dimensional information of the face to be tested and the three-dimensional information of the determined face is not equal to each other or a difference between the three-dimensional of the face to be tested and the three-dimensional information of the determined face exceeds a pre-determined value.

7. The method of claim 5, wherein the recognition signal is output by the microprocessor upon the condition that the microprocessor determines that the three-dimensional information of the face to be tested and the three-dimensional information of the determined face is equal to each other or a difference between the three-dimensional of the face to be tested and the three-dimensional information of the determined face does not exceed the pre-determined value.

8. The method of claim 5, wherein the three-dimensional information of the face comprises three-dimensional coordinates of all points of the face in the determined field.

9. The method of claim 5, wherein obtaining the three-dimensional information of the determined face comprising:
   capturing an image of a person in the determined field via the image capture module;
   detecting the image by the face detection module to obtain the determined face of the person, to record coordinates of the determined face in the image; and
   scanning the determined face in the determined field by the LIDAR system according to the coordinates of the determined face in the image, to obtain three-dimensional information of the determined face, and to transmit the three-dimensional information of the determined face to the microprocessor.

* * * * *